(12) United States Patent
Ehret et al.

(10) Patent No.: US 11,760,597 B2
(45) Date of Patent: Sep. 19, 2023

(54) WEB-TENSION-MEASURING DEVICE, USE OF SUCH AND A ROLLER COMPRISING A WEB-TENSION-MEASURING DEVICE

(71) Applicant: VOITH PATENT GMBH, Heidenheim (DE)

(72) Inventors: David Ehret, Heubach (DE); Uwe Joos, Koenigsbronn (DE); Samuel Soldan, Giengen (DE); Werner Leitenberger, Schlier (DE)

(73) Assignee: Voith Patent GmbH, Heidenheim (DE)

( * ) Notice: Subject to any disclaimer, the term of this patent is extended or adjusted under 35 U.S.C. 154(b) by 358 days.

(21) Appl. No.: 17/275,781

(22) PCT Filed: Aug. 14, 2019

(86) PCT No.: PCT/EP2019/071771
§ 371 (c)(1),
(2) Date: Mar. 12, 2021

(87) PCT Pub. No.: WO2020/052893
PCT Pub. Date: Mar. 19, 2020

(65) Prior Publication Data
US 2022/0048720 A1    Feb. 17, 2022

(30) Foreign Application Priority Data

Sep. 12, 2018 (DE) .......................... 102018122207.6

(51) Int. Cl.
*B65H 23/04* (2006.01)
*G01L 5/10* (2020.01)
(Continued)

(52) U.S. Cl.
CPC ............. *B65H 23/044* (2013.01); *D21F 7/00* (2013.01); *G01L 5/107* (2013.01)

(58) Field of Classification Search
CPC ....... B65H 23/044; B65H 59/40; G01L 5/108; G01L 5/10; G01L 5/107; G01L 5/102; G01L 5/06; D21F 7/00
See application file for complete search history.

(56) References Cited

U.S. PATENT DOCUMENTS 2,809,519 A * 10/1957 Kaestner ................. B21B 38/02
73/159
5,275,062 A * 1/1994 Turley ...................... G01L 5/10
73/862.391
(Continued)

FOREIGN PATENT DOCUMENTS

CA          790301 A  *  7/1968
DE        2552576 A1       6/1976
(Continued)

*Primary Examiner* — Daniel J Colilla
(74) *Attorney, Agent, or Firm* — Laurence A. Greenberg; Werner H. Stemer; Ralph E. Locher

(57) ABSTRACT

A web-tension-measuring device has two plates, which can be rotated relative to one another about an axis of rotation, to be precise such that the one free end of the one plate can be moved towards, or away from, the corresponding, opposite free end of the other plate. A force transducer is arranged in the region of the free ends of the two plates and outside the axis of rotation. The force transducer is configured, during movement of the free ends of the two plates towards one another, to detect a corresponding compressive loading arising from the movement and, during the movement of the free ends away from one another, to detect a corresponding tensile loading between the two plates.

19 Claims, 1 Drawing Sheet

(51) Int. Cl.
*D21F 7/00* (2006.01)
*G01L 5/107* (2020.01)

(56) References Cited

U.S. PATENT DOCUMENTS 6,360,596 B1 * 3/2002 Callendrier ............ G01L 1/2243
73/159
8,156,802 B2 4/2012 Werber et al.

FOREIGN PATENT DOCUMENTS

| | | |
|---|---|---|
| DE | 202005007443 U1 | 7/2005 |
| DE | 102006023529 B4 | 7/2008 |
| DE | 102010003504 A1 | 10/2011 |
| WO | 9617233 A1 | 6/1996 |
| WO | 2008064917 A1 | 6/2008 |
| WO | 2011120753 A2 | 10/2011 |

* cited by examiner

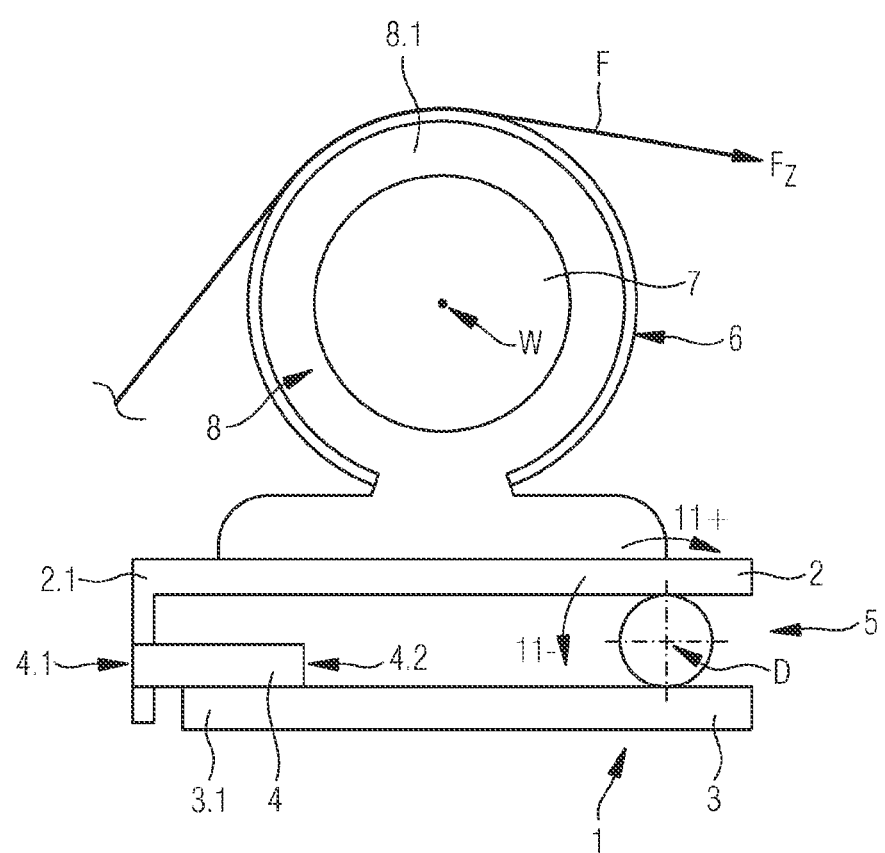

WEB-TENSION-MEASURING DEVICE, USE OF SUCH AND A ROLLER COMPRISING A WEB-TENSION-MEASURING DEVICE

BACKGROUND OF THE INVENTION

Field of the Invention

The invention relates to a web tension measuring device, the use of such and a roll comprising a web tension measuring device, in detail as claimed in the independent claims. Preferably, this relates to the use of the same in machines for producing or treating fibrous webs, such as paper, board or tissue paper.

To determine the tension on clothing in such machines, by way of example load cells are used, to which part of the tensile force of the respective clothing is applied between two plates and via a rotary joint. However, a rocker formed in this way is assigned only one load cell. As soon as the plates move toward each other, a compressive loading is detected. A pressure measurement is not possible without a comparatively complicated construction comprising pre-loading elements. Thus, the load cell must always be provided in an appropriate installation position in order to be able to measure the compressive force. An arrangement differing therefrom, for example upside is down, consequently possible only with a comparatively high technical outlay.

SUMMARY OF THE INVENTION

The object of the invention is to specify a web tension measuring device that is improved as compared with the prior art. Thus, in particular, a reliable web tension measurement is to be possible, specifically irrespective of the installation position of the web tension measuring device. In addition, this is intended to be distinguished by a low outlay on construction and manufacture.

According to the invention, the object is achieved by an embodiment as claimed in the independent claims. Further advantageous features of the embodiment according to the invention will be found in the subclaims.

The inventors have recognized that the object according to the invention is achieved particularly satisfactorily if a force transducer which can detect both compressive and tensile loadings is provided. As a result, a web tension measuring device can be provided which, irrespective of its installation position, always reliably detects the web tension of a web wrapped at least partly around the outer circumference of a roll.

The term web tension $F_z$ means the tensile force or its opposed reaction force of the same magnitude, in each case measured in newtons, which acts on the web while the latter rolls on the outer circumference of the roll for its transport and, for this purpose, wraps at least partly around said roll. The web tension is therefore, according to the present invention, measured indirectly via reaction forces and/or torques present on the bearing arrangement of the roll. The principles of such a calculation are disclosed in WO 96/17233, of which the disclosure content is hereby expressly incorporated in its entirety. In the document, the force FD corresponds to the web tension $F_z$. The sensors described there are pure compressive force transducers.

In the sense of the invention, a web is understood to be an endless or non-endless flat structure, the extent of which in the longitudinal and transverse direction is substantially greater than in the vertical direction. This includes material webs such as fibrous material webs, for example in the form of paper, board or tissue webs. Furthermore, functional webs, in particular for the transport and/or the support of such fibrous material webs are themselves understood amongst such webs. Some functional webs can be clothings. Clothings are endlessly circulating belts or loops of belts which are guided over at least two, preferably a multiplicity, of rolls or deflection rolls and are used to guide and support fibrous material webs transported over a predefined distance by the same. In machines for producing or treating material webs, in particular paper, board or tissue webs, clothing is used to support and guide a fibrous material suspension or fibrous material web. Clothing of this type can then be forming or dryer fabric and press felts.

The term loading means all external force variables (forces and torques) which act on a component.

Particularly preferably, the force transducer used is a shear sensor which picks up shear loadings. Thus, with only a single sensor, tensile and compressive loadings between the two plates can both be measured. The constructional outlay for such a web tension measuring device is therefore reduced considerably.

The present invention relates to a roll, in particular a roll of a machine for producing or treating fibrous material webs, such as paper, board or tissue paper, comprising a shaft which can be rotated about a roll axis, which is rotatably mounted in the region of its axial ends in a bearing arrangement and around which a web can wrap over at least part of its outer circumference, wherein at least one bearing arrangement of the shaft is assigned a web tension measuring device according to the invention.

Furthermore, the present invention relates to the bearing arrangement comprising a bearing housing and a web tension measuring device according to the invention arranged indirectly or directly thereon.

Finally, the present invention also relates to the use of a web tension measuring device according to the invention for measuring the web tension of a web which wraps at least partly around the outer circumference of a roll according to the invention.

DETAILED DESCRIPTION OF THE INVENTION

Further advantageous expressions of the invention will be explained by using exemplary embodiments and with reference to the drawings. The aforementioned features can advantageously be implemented not only in the combination illustrated but also combined individually with one another.

BRIEF DESCRIPTION OF THE DRAWING

The single FIGURE of the drawing shows a possible embodiment of a web tension measuring device according to the invention in a side view which is schematic and therefore not to scale in the direction of the axis of rotation D of the web tension measuring device 1.

As can be gathered from the FIGURE, the web tension measuring device 1 can be used indirectly to detect the web tension $F_z$ of a web F transported by a roll 6. Such a roll 6 comprises a shaft 7 that can be rotated about a roll axis W. The web F always wraps around part of the outer circumference of said roll. The roll 6 can therefore be a driven roll, then called a guide roll, or a co-rotating roll, then called a deflection roll. In any case, the roll 6 has a bearing arrangement 8 at its two axial ends, in order to dissipate the axial and/or radial forces of the latter to a frame of the machine, for example.

For the indirect detection of the web tension $F_z$, at least one (or both) bearing arrangement(s) 8 has a bearing housing 8.1, to which the web tension measuring device 1 is connected. From the reaction forces acting on the bearing housing 8.1, it is then possible to draw conclusions about the actually present web tension $F_z$.

To detect these reaction forces, the web tension measuring device 1 has two plates 2, 3 which, in the present case, are arranged at a distance from each other, here, by way of example, parallel to each other. At their one end, both plates 2, 3 here can be pivoted at an angle about the axis of rotation D relative to each other. This pivoting (or rotation) can be achieved, for example, by means of a rotary joint 5, via which the two plates 2, 3 are connected to each other. Thus, the free ends 2.1, 3.1 of the plates 2, 3 can then be moved toward each other and away from each other.

In order to permit such a movement, the plates are preferably designed separately from each other, which therefore means not designed in one piece with each other in the region of the free ends 2.1, 3.1. In principle, it would be conceivable to connect the two plates 2, 3 by means of a third plate (not illustrated). This could taper between the two plates 2, 3 and therefore form an axis of rotation under loading, around which the two plates 2, 3 could then pivot relative to each other.

Also arranged in the region of the free ends 2.1, 3.1 of the plates 2, 3 is a force transducer 4. According to the invention, this is designed such that it can detect both tensile and compressive loadings which result between the two plates 2, 3 as a result of the rotational movement.

In order to pick up both tensile and compressive loadings, the force transducer 4 can be designed as a shear sensor. In particular, the one axial end 4.1 of the force transducer 4 can then be connected or connectable to the free end 2.1 of the one plate 2, and the other axial end 4.2 of the force transducer 4 can then be connected or connectable to the other free end 3.1 of the further plate 3, which is opposite the first plate. If then, as a result of a loading, the free end 2.1 of the plate 2 here moves toward the free end 3.1 of the plate 3, then a compressive loading is detected by the force transducer 4. The result is a torque M-, which acts in the counterclockwise direction and acts on the axis of rotation D. The angle which the two plates 2, 3 delimit with each other becomes smaller. If, in the opposite direction of rotation, the free end 2.1 of the plate 2 is rotated away from the free end 3.1 of the plate 3, then the force transducer 4 picks up a tensile force. This corresponds to a torque M+ in the clockwise direction around the axis of rotation D. The angle which the two plates 2, 3 delimit with each other becomes larger. The torque results from the fact that the force transducer 4 is not located in the axis of rotation D. As explained at the beginning, it is possible to draw conclusions about the magnitude of the web tension $F_z$ via the tensile or compressive loadings on the plates 2, 3 which results from the reaction forces on the bearing housing 8.1.

In principle, the following embodiment, not illustrated, would also be conceivable: instead of or in addition to the rotary joint 5 from the FIGURE, a further force transducer 4 would be provided. The axial ends 2.1, 3.1 of the plates 2, 3 could be designed analogously to the FIGURE. The rotary joint or the axis of rotation (also an imaginary one) would then be located between the two force transducers. The advantages according to the invention could also be implemented well with such an embodiment. Here, that already explained in relation to the FIGURE is also analogously true. In both cases, only a single force transducer according to the invention is necessary for each free end of the plates.

Irrespective of the embodiment illustrated, it is advantageous if the axis of rotation D of the two plates is not located in a vertical plane onto the plates 2, 3 through the roll axis W but is at a distance therefrom. Thus, for example, the axis of rotation D can be chosen as shown in the FIGURE, such that it is located opposite the axial ends 2.1, 3.1 of the plates 2, 3. The force transducer 4 and the axis of rotation D of the web tension measuring device 1 lie in a plane which extends at right angles to a plane through the roll axis W. Here, the axis of rotation D extends outside and thus at a distance from said plane. In other words, the axis of rotation D can be arranged at the axial ends of the plates 2, 3 opposite the force transducer. In this way, in the installation position illustrated in the FIGURE, forces which act vertically on the plates through the roll axis W onto the web tension measuring device can also be determined by means of the web tension measuring device.

The invention claimed is:

1. A web tension measuring device, comprising:
two plates disposed to be rotated relative to one another about an axis of rotation, to thereby move one free end of one of said plates toward, or away from, a corresponding, opposite free end of another of said plates;
a force transducer disposed in a region of the free ends of said two plates and distally from the axis of rotation;
said force transducer being configured, during a movement of the free ends of said two plates towards one another, to detect a compressive loading corresponding to the movement and, during a movement of the free ends away from one another, to detect a corresponding tensile loading between said two plates.

2. The web tension measuring device according to claim 1, further comprising a rotary joint coupling said the two plates to one another, enabling said two plates to be rotated relative to one another about the axis of rotation.

3. The web tension measuring device according to claim 1, wherein said plates are arranged at a spacing distance from one another.

4. The web tension measuring device according to claim 3, wherein said plates are arranged one above the other.

5. The web tension measuring device according to claim 1, wherein said two plates are two separate plates.

6. The web tension measuring device according to claim 1, wherein said force transducer is arranged between said two plates.

7. The web tension measuring device according to claim 1, wherein said force transducer has a first axial end connected to the free end of a first one of said plates, and a second axial end connected to the free end of a second one of said plates, opposite said first one of said plates, to thereby load the force transducer in shear under a corresponding tensile loading or compressive loading.

8. The web tension measuring device according to claim 1, wherein each of the free ends of said two plates is provided with a single said force transducer.

9. The web tension measuring device according to claim 1, wherein said force transducer is a shear sensor configured for picking up shear loadings.

10. A roll, comprising:
a shaft rotatably mounted for rotation about a roll axis, said shaft having axial ends rotatably mounted in a bearing arrangement;
wherein the roll has an outer circumference for wrapping a web over at least a part thereof; and a web tension measuring device according to claim 1 assigned to at least one said bearing arrangement of said shaft.

11. The roll according to claim 10, configured for a machine for producing or treating fibrous material webs selected from the group consisting of paper, board, and tissue paper.

12. The roll according to claim 10, wherein said bearing arrangement comprises a bearing housing and said web tension measuring device is indirectly or directly connected to said housing.

13. The roll according to claim 10, wherein the axis of rotation of said web tension measuring device extends parallel to and at a distance from the roll axis of the roll.

14. The roll according to claim 10, wherein the force transducer and the axis of rotation of said web tension measuring device lie in a plane which extends at right angles to a plane through the roll axis.

15. The roll according to claim 14, wherein the axis of rotation lies outside and at a spacing distance from the plane through the roll axis.

16. A method of measuring a web tension of a web wrapping at least partly around an outer circumference of a roll, the method comprising:
- rotatably supporting axial ends of a shaft of the roll for rotation about a roll axis in a bearing arrangement;
- wrapping the web over a part of an outer circumference of the roll; and
- providing a web tension measuring device according to claim 15 assigned to at least one bearing arrangement of the shaft and measuring the web tension of the web while rotating the roll.

17. The method according to claim 16, wherein the web is a fibrous material web or a clothing.

18. The method according to claim 17, wherein the web is a fibrous material web selected from the group consisting of a paper web, a board, and a tissue web.

19. The method according to claim 17, wherein the web is a clothing selected from the group consisting of a forming fabric, a dryer fabric, and a press felt.

\* \* \* \* \*